US012576721B2

(12) United States Patent
Lee

(10) Patent No.: US 12,576,721 B2
(45) Date of Patent: Mar. 17, 2026

(54) METHOD AND SYSTEM FOR VERIFYING BATTERY VOLTAGE DETECTION OF ECO-FRIENDLY VEHICLES

(71) Applicants:Hyundai Motor Company, Seoul (KR); Kia Corporation, Seoul (KR)

(72) Inventor: Jung Hyun Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 33 days.

(21) Appl. No.: 18/797,871

(22) Filed: Aug. 8, 2024

(65) Prior Publication Data

US 2025/0229634 A1     Jul. 17, 2025

(30) Foreign Application Priority Data

Jan. 11, 2024     (KR) ........................ 10-2024-0004879

(51) Int. Cl.
*B60L 3/00*          (2019.01)
*B60L 58/12*         (2019.01)
*B60L 58/16*         (2019.01)

(52) U.S. Cl.
CPC ............. *B60L 3/0046* (2013.01); *B60L 58/12* (2019.02); *B60L 58/16* (2019.02); *B60L 2240/545* (2013.01); *B60L 2240/547* (2013.01)

(58) Field of Classification Search
CPC ........ B60L 3/0046; B60L 58/12; B60L 58/16; B60L 2240/545; B60L 2240/547; G01R 19/16576; G01R 31/3835; G01R 31/392; B60Y 2200/91; B60Y 2306/15; B60Y 2400/112; Y02T 10/70; Y02T 10/72

USPC ........................................................ 701/1, 22
See application file for complete search history.

(56) References Cited

U.S. PATENT DOCUMENTS

| | | | | |
|---|---|---|---|---|
| 5,625,272 A * | 4/1997 | Takahashi | ............... | B60L 58/10 |
| | | | | 320/160 |
| 6,074,775 A * | 6/2000 | Gartstein | .............. | H01M 10/46 |
| | | | | 429/61 |
| 6,118,248 A * | 9/2000 | Gartstein | .............. | H01M 10/48 |
| | | | | 320/136 |
| 6,163,131 A * | 12/2000 | Gartstein | ............ | H02J 7/00712 |
| | | | | 324/426 |
| 8,183,833 B2 * | 5/2012 | Kobayashi | ........ | H02J 7/007184 |
| | | | | 324/427 |
| 9,350,192 B2 * | 5/2016 | Lee | ..................... | H02M 1/4266 |
| 9,397,370 B2 * | 7/2016 | Nebrigic | ............... | H01M 10/44 |

(Continued)

*Primary Examiner* — Jaime Figueroa
(74) *Attorney, Agent, or Firm* — Morgan, Lewis & Bockius LLP

(57)          ABSTRACT

In a method and system for verifying battery voltage detection in an eco-friendly vehicle, the method for verifying battery voltage detection in an eco-friendly vehicle includes the steps of determining whether abnormality has occurred in voltage detection based on a voltage of a first battery cell with a highest voltage among a plurality of battery cells forming a battery at a first time point when a limited discharge output of the battery decreases at or below a threshold power while the vehicle is running and a voltage of a second battery cell with a lowest voltage at the first time point, and recovering an output of the battery to a normal output that allows the vehicle to drive normally and driving the vehicle if it is determined that the abnormality has occurred in the voltage detection.

22 Claims, 6 Drawing Sheets

(56) References Cited

U.S. PATENT DOCUMENTS

| | | | | | |
|---|---|---|---|---|---|
| 9,461,494 | B2 * | 10/2016 | Ito | | B60L 3/04 |
| 9,925,891 | B2 * | 3/2018 | Ko | | B60K 6/48 |
| 10,189,360 | B2 * | 1/2019 | Ohtomo | | H02J 7/00036 |
| 2002/0001745 | A1 * | 1/2002 | Gartstein | | H01M 6/5044 |
| | | | | | 320/132 |
| 2003/0052650 | A1 * | 3/2003 | Gunji | | B60K 1/02 |
| | | | | | 320/132 |
| 2005/0134230 | A1 * | 6/2005 | Sato | | H01M 10/486 |
| | | | | | 320/136 |
| 2007/0212596 | A1 * | 9/2007 | Nebrigic | | H01M 10/42 |
| | | | | | 429/61 |
| 2010/0253357 | A1 * | 10/2010 | Seo | | H02J 7/00306 |
| | | | | | 324/427 |
| 2011/0140665 | A1 * | 6/2011 | Tamezane | | H02J 7/0016 |
| | | | | | 320/118 |
| 2012/0057316 | A1 * | 3/2012 | Kaneshige | | H01M 50/284 |
| | | | | | 361/752 |
| 2012/0161708 | A1 * | 6/2012 | Miura | | B60L 58/14 |
| | | | | | 903/903 |
| 2013/0154572 | A1 * | 6/2013 | Ito | | H01M 10/441 |
| | | | | | 320/136 |
| 2013/0234672 | A1 * | 9/2013 | Kubota | | H02J 7/0016 |
| | | | | | 320/134 |
| 2014/0015454 | A1 * | 1/2014 | Kunimitsu | | H01M 10/482 |
| | | | | | 320/134 |
| 2014/0139189 | A1 * | 5/2014 | Izumi | | H02J 7/0048 |
| | | | | | 320/134 |
| 2014/0361750 | A1 * | 12/2014 | Lee | | H02J 7/02 |
| | | | | | 320/137 |
| 2017/0043677 | A1 * | 2/2017 | Ko | | B60W 10/06 |
| 2019/0178951 | A1 * | 6/2019 | Cha | | G01R 31/3842 |
| 2019/0245363 | A1 * | 8/2019 | Hitomi | | H01M 4/131 |
| 2019/0252735 | A1 * | 8/2019 | Sung | | H01M 10/486 |
| 2019/0257890 | A1 * | 8/2019 | Cha | | H01M 10/42 |
| 2020/0103468 | A1 * | 4/2020 | Watanabe | | G01R 31/374 |
| 2020/0358297 | A1 * | 11/2020 | Sano | | H01M 10/48 |
| 2021/0055348 | A1 * | 2/2021 | Kim | | G01R 31/367 |
| 2021/0188109 | A1 * | 6/2021 | Inoue | | H02J 7/00714 |
| 2021/0311124 | A1 * | 10/2021 | Takahashi | | B60L 1/00 |
| 2022/0283244 | A1 * | 9/2022 | Honda | | H01M 10/425 |
| 2022/0371531 | A1 * | 11/2022 | Eifert | | H02J 7/0068 |
| 2023/0369660 | A1 * | 11/2023 | Lee | | H01M 10/48 |
| 2023/0384393 | A1 * | 11/2023 | Lee | | G01R 31/392 |
| 2024/0012064 | A1 * | 1/2024 | Lee | | G01R 31/374 |
| 2024/0085486 | A1 * | 3/2024 | Lee | | G01R 31/392 |

* cited by examiner

| | |
|---|---|
| vehicle control unit (270) | battery management unit (230) |
| sensor unit (250) | battery (210) |

Figure 7:
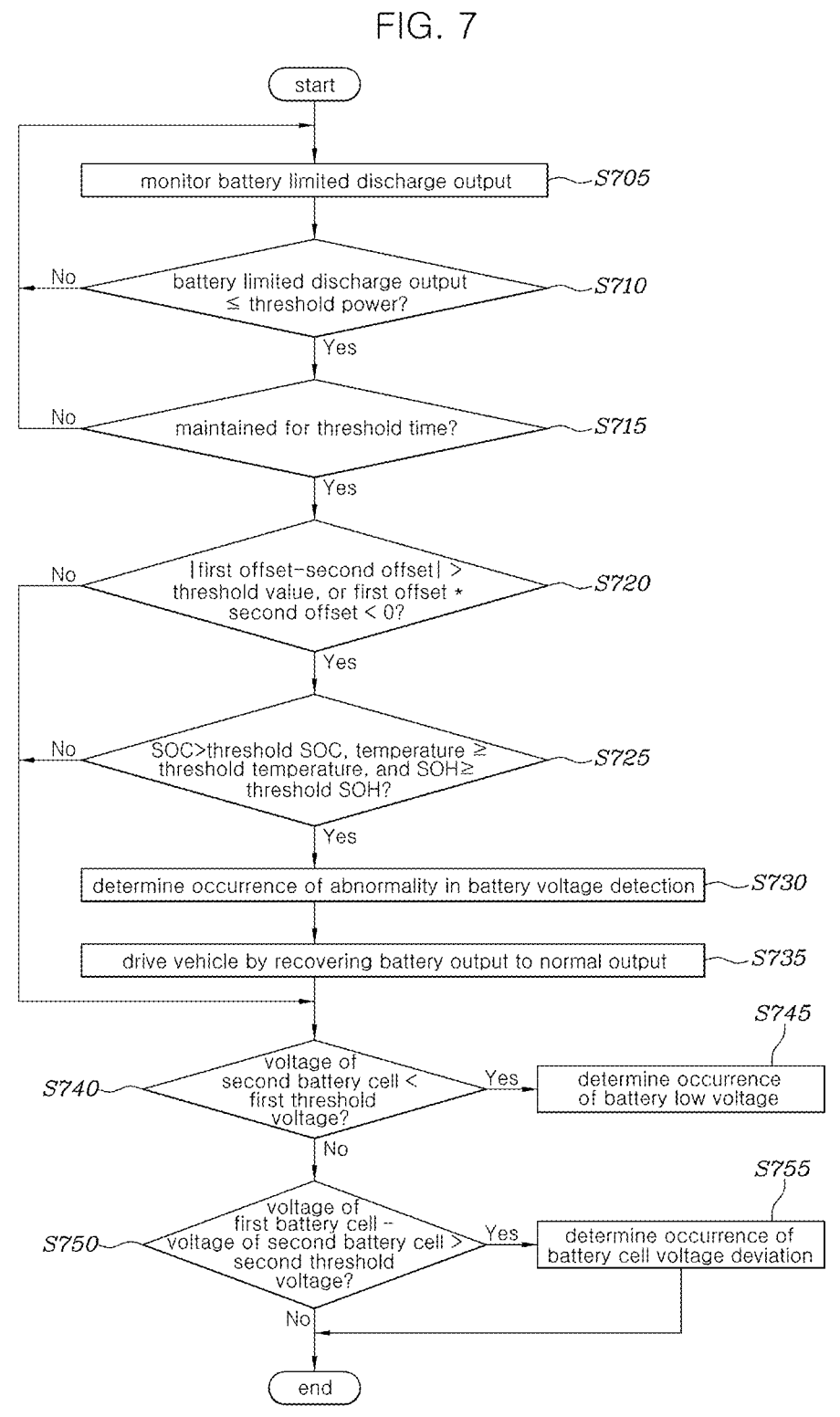

FIG. 7 start monitor battery limited discharge output — S705 battery limited discharge output ≤ threshold power? — S710
No / Yes maintained for threshold time? — S715
No / Yes

|first offset−second offset| > threshold value, or first offset * second offset < 0? — S720
No / Yes SOC>threshold SOC, temperature ≥ threshold temperature, and SOH≥ threshold SOH? — S725
No / Yes determine occurrence of abnormality in battery voltage detection — S730 drive vehicle by recovering battery output to normal output — S735

S740 — voltage of second battery cell < first threshold voltage?
Yes → determine occurrence of battery low voltage — S745
No S750 — voltage of first battery cell − voltage of second battery cell > second threshold voltage?
Yes → determine occurrence of battery cell voltage deviation — S755
No end

METHOD AND SYSTEM FOR VERIFYING BATTERY VOLTAGE DETECTION OF ECO-FRIENDLY VEHICLES

CROSS REFERENCE TO RELATED APPLICATION

The present application claims priority to Korean Patent Application No. 10-2024-0004879, filed Jan. 11, 2024, the entire contents of which is incorporated herein for all purposes by this reference.

BACKGROUND OF THE PRESENT DISCLOSURE

Field of the Present Disclosure

The present disclosure relates to a battery management system, and more specifically, to a method and system for verifying battery voltage detection of an eco-friendly vehicle.

Description of Related Art

Eco-friendly vehicles such as hybrid electronic vehicle (HEV), plug-in HEV (PHEV), and electronic vehicle (EV) have a built-in battery, which is a storage device to store electrical energy, to drive the motor. In particular, these vehicles have built-in high-voltage batteries that are different from the low-voltage batteries provided in existing internal combustion engine vehicles. A high-voltage battery may include tens to hundreds of battery cells, and the system voltage is calculated and expressed by the sum of the voltages of these battery cells. In eco-friendly vehicles, the system is controlled by monitoring these voltage of the battery cells. Therefore, it is important to ensure the reliability of cell voltage sensing.

Meanwhile, in conventional eco-friendly vehicles, when the voltage of the cell with the lowest voltage among the cells forming the battery is below a certain preset voltage (e.g., 2.5V), a battery protection logic that limits a discharge power to prevent overdischarge of the battery is operated to protect the high-voltage battery. However, a low voltage may be measured in the battery cell due to a voltage sensing problem or a defect in a specific battery cell. If the battery's discharge power is controlled, the vehicle may suddenly stop while driving on the road, causing a traffic accident.

For example, as illustrated in FIG. 1, when the voltage of the cell with the lowest voltage among the cells forming the battery drops from 3.66V to 2.5V or less, the battery discharge power of an eco-friendly vehicle may drop to 0 kW. However, if the voltage of the cell whose voltage drops to 2.5V or less moves between 2.48V and 3.16V, it is not determined that there is a problem in voltage sensing because the cell voltage remains at or above 0.5V in the conventional system. In the instant case, the battery discharge power drops to 0 kW and briefly recovers to 9 kW, but thereafter remains at 300 W, making driving of the vehicle impossible and the vehicle coasting for a certain section and then stopping. In the instant case, about 10 seconds after the battery discharge power drops to 0 kW, the voltage decreases from 3.66V to 3.64V for the cell with the highest voltage, but the voltage actually increases from 2.48V to 2.92V for the cell with the lowest voltage. In the instant case, it is suspected that a defect has occurred in the voltage sensing of the battery, but because low voltage has occurred in the system, the vehicle may suddenly stop while driving, which may cause a traffic accident.

Therefore, in this field of the present disclosure, there is a demand for technology that can ensure driver safety by verifying the reliability of voltage sensing in situations where the battery of an eco-friendly vehicle is low voltage and preventing unnecessary battery power limitations from occurring.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a technology that can verify the reliability of voltage sensing when the battery of an eco-friendly vehicle is low voltage.

Another technical object of the present disclosure is to provide a technology that can prevent unnecessary battery power limitations from occurring due to voltage sensing problems in eco-friendly vehicles or defects in specific battery cells.

Yet another technical object of the present disclosure is to provide a technology that can ensure driver safety by preventing a vehicle from suddenly stopping due to unnecessary limitations in vehicle battery discharge power.

The technical objects to be achieved by the present disclosure are not limited to the technical objects mentioned above, and other technical objects not mentioned may be clearly understood by those skilled in the art from the following descriptions.

In various aspects of the present disclosure, a method for verifying battery voltage detection in an eco-friendly vehicle according to an exemplary embodiment of the present disclosure includes the steps of determining whether abnormality has occurred in voltage detection based on a voltage of a first battery cell with a highest voltage among a plurality of battery cells forming a battery at a first time point when a limited discharge output of the battery decreases at or below a threshold power while the vehicle is running and a voltage of a second battery cell with a lowest voltage at the first time point, and recovering an output of the battery to a normal output that allows the vehicle to drive normally and driving the vehicle if it is determined that the abnormality has occurred in the voltage detection.

In the instant case, the method for verifying battery voltage detection in an eco-friendly vehicle may further include the step of determining whether a limited discharge output of the battery is maintained at or below the threshold power to a second time point when a preset predetermined time has elapsed from the first time point if the limited discharge output of the battery decreases to or below the threshold power while the vehicle is running, wherein the step of determining whether the abnormality has occurred in the voltage detection may be performed if the limited discharge output of the battery is maintained at or below the threshold power from the first time point to the second time point.

In the instant case, the method for verifying battery voltage detection in an eco-friendly vehicle may further include the step of maintaining a discharge output of the battery at a target minimum output value if the limited discharge output of the battery is maintained at or below the threshold power from the first time point to the second time point.

In the instant case, the step of determining whether the abnormality has occurred in the voltage detection may further include the steps of determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, or determining whether signs of the first offset and second offset are opposite to each other.

In the instant case, the step of determining whether the abnormality has occurred in the voltage detection may further include the steps of determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, and determining whether signs of the first offset and second offset are opposite to each other.

In the instant case, the step of determining whether the abnormality has occurred in the voltage detection may further include the step of determining whether a state of charge (SOC) value of the battery exceeds a threshold SOC.

In the instant case, the step of determining whether the abnormality has occurred in the voltage detection may further include the step of determining whether a temperature of the battery is greater than or equal to a threshold temperature.

In the instant case, the step of determining whether the temperature of the battery is greater than or equal to the threshold temperature may further include the step of determining whether the temperature of the battery cell with a lowest temperature among the plurality of battery cells forming the battery is greater than or equal to the threshold temperature.

In the instant case, the step of determining whether the abnormality has occurred in the voltage detection may further include the step of determining whether a state of health (SOH) of the battery is greater than or equal to a threshold SOH.

In the instant case, the method for verifying battery voltage detection in an eco-friendly vehicle may further include the step of whether the abnormality has occurred in the battery.

In the instant case, the step of determining whether the abnormality has occurred in the battery may further include the steps of determining whether the voltage of the second battery cell is less than a first threshold voltage, and determining whether a voltage difference between the first battery cell and the second battery cell exceeds a second threshold voltage.

Furthermore, a system for verifying battery voltage detection in an eco-friendly vehicle according to an exemplary embodiment of the present disclosure includes a battery that stores power energy for driving a vehicle and includes a plurality of cells, a sensor unit including a voltage sensor which is configured to detect voltage of the plurality of battery cells forming the battery, a battery management unit that is configured to determine whether abnormality has occurred in voltage detection based on a voltage of a first battery cell with a highest voltage among a plurality of battery cells forming a battery at a first time point when a limited discharge output of the battery decreases at or below a threshold power while the vehicle is running and a voltage of a second battery cell with a lowest voltage at the first time point, and recovers an output of the battery to a normal output that allows the vehicle to drive normally if it is determined that the abnormality has occurred in the voltage detection, and a vehicle control unit which is configured to control the vehicle based on the output of the battery.

In the instant case, the battery management unit may be configured to determine whether a limited discharge output of the battery is maintained at or below the threshold power to a second time point when a preset predetermined time period has elapsed from the first time point if the limited discharge output of the battery decreases to or below the threshold power while the vehicle is running, and the battery management unit may be configured to determine whether the abnormality has occurred in the voltage detection is performed if the limited discharge output of the battery is maintained at or below the threshold power from the first time point to the second time point.

In the instant case, the battery management unit may maintain a discharge output of the battery at a target minimum output value if the limited discharge output of the battery is maintained at or below the threshold power from the first time point to the second time point.

In the instant case, the battery management unit may be configured to determine whether the abnormality has occurred in the voltage detection by determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, or determining whether signs of the first offset and second offset are opposite to each other.

In the instant case, the battery management unit is configured to determine whether the abnormality has occurred in the voltage detection by determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, and determining whether signs of the first offset and second offset are opposite to each other.

In the instant case, the battery management unit may be configured to determine whether the abnormality has occurred in the voltage detection by determining whether a state of charge (SOC) value of the battery exceeds a threshold SOC.

In the instant case, the battery management unit may be configured to determine whether the abnormality has occurred in the voltage detection by determining whether a temperature of the battery is greater than or equal to a threshold temperature.

In the instant case, the battery management unit may be configured to determine whether the temperature of the battery is greater than or equal to the threshold temperature by determining whether the temperature of the battery cell with a lowest temperature among the plurality of battery cells forming the battery is greater than or equal to the threshold temperature.

In the instant case, the battery management unit may be configured to determine whether the abnormality has occurred in the voltage detection by determining whether a state of health (SOH) of the battery is greater than or equal to a threshold SOH.

In the instant case, the battery management unit may be configured to determine whether the abnormality has occurred in the battery.

In the instant case, the battery management unit may be configured to determine whether the abnormality has occurred in the battery by determining whether the voltage of the second battery cell is less than a first threshold voltage, and determining whether a voltage difference between the first battery cell and the second battery cell exceeds a second threshold voltage.

According to various embodiments of the present disclosure as described above, the reliability of voltage sensing may be verified when the battery of an eco-friendly vehicle is low voltage.

Furthermore, it is possible to prevent unnecessary battery power limitations from occurring due to voltage sensing problems in eco-friendly vehicles or defects in predetermined battery cells.

Furthermore, driver safety may be ensured by preventing the vehicle from suddenly stopping due to unnecessary limiting of the vehicle's battery discharge power.

It will be appreciated by persons skilled in the art that the effects which may be achieved through the present disclosure are not limited to what has been described hereinabove and other advantages of the present disclosure will be more clearly understood from the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a block diagram schematically illustrating a system for verifying battery voltage detection according to an exemplary embodiment of the present disclosure.

FIG. 7 is a flowchart illustrating a method for verifying battery voltage detection according to an exemplary embodiment of the present disclosure.

6

Figure 1:
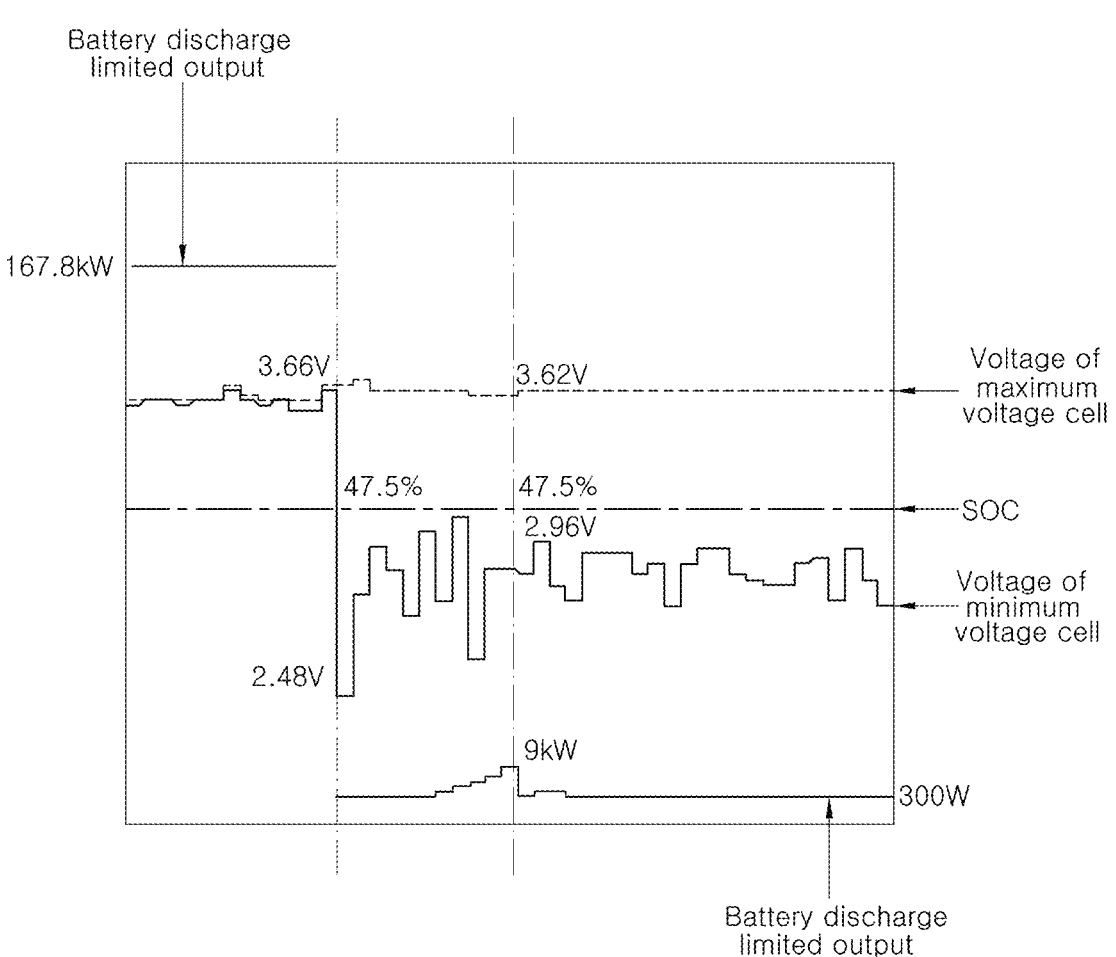
FIG. 1 illustrates an example of a situation in which a battery discharge power of an eco-friendly vehicle is limited due to a voltage sensing defect.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the appended drawings. The same or similar components are provided the same reference numbers and redundant description thereof is omitted. The suffixes "module" and "unit" of elements herein are used for convenience of description and thus may be used interchangeably and do not have any distinguishable meanings or functions. Furthermore, in describing the exemplary embodiments included in the specification, if it is determined that detailed descriptions of related known technologies may obscure the gist of the exemplary embodiments included in the present specification, the detailed descriptions will be omitted. Furthermore, the appended drawings are provided for easy understanding of embodiments included in the specification and do not limit technical spirits included in the specification, and the exemplary embodiments should be construed as including all modifications, equivalents, and alternatives falling within the spirit and scope of the present disclosure.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In the specification, it will be further understood that the terms "comprise" and "include" specify the presence of stated features, integers, steps, operations, elements, components, and/or combinations thereof, but do not preclude in advance the possibility of the presence or addition of one or more other features, integers, steps, operations, elements, components, and/or combinations.

FIG. 2 is a block diagram schematically illustrating a system for verifying battery voltage detection according to an exemplary embodiment of the present disclosure.

Referring to FIG. 2, a system 200 for verifying battery voltage detection according to an exemplary embodiment of the present disclosure includes a battery 210, a battery management unit 230, a sensor unit 250, and a vehicle control unit 270.

The battery 210 stores power energy for driving a vehicle and includes a plurality of cells.

The battery management unit 230 monitors the limited discharge output of the battery 210, and if the limited discharge output of the battery 210 decreases to or below a threshold power, the battery management unit 230 operates in an emergency output mode in which the discharge output of the battery 210 is maintained at a target minimum output value.

In the instant case, the threshold power may be set in various ways depending on the vehicle and battery configuration, and may be 10 KW, for example.

Furthermore, the target minimum output value of the battery 210 in the emergency output mode of the battery 210 may be set in various ways depending on the system configuration, and may be set to 10 KW, for example.

In addition, if the discharge output of the battery 210 decreases to or below the threshold power while the vehicle is running, the battery management unit 230 is configured to determine whether the discharge output of the battery 210 is maintained at or below the threshold power for a threshold time. If the discharge output of the battery 210 is maintained at or below the threshold power for a threshold time, the battery management unit 230 is configured to determine whether an abnormality has occurred in the voltage detection of the battery 210.

In the instant case, the threshold time may be the time from a first time point when the limited discharge output of the battery 210 decreases at or below the threshold power to a second time point when a preset predetermined time period has elapsed.

In the instant case, the threshold time may be set in various ways depending on the system configuration, for example, it may be set to 10 seconds.

In the instant case, to determine whether abnormality has occurred in the voltage detection of the battery 210, the battery management unit 230 may compare differences in the amount of change between the voltage of a first battery cell with the highest voltage at the first time point among the plurality of battery cells and the voltage of a second battery cell with the lowest voltage at the first time point.

In an exemplary embodiment of the present disclosure, the battery management unit 230 may include at least one processor and a memory for storing computer-readable instructions so as to determine whether abnormality has occurred in the voltage detection of the battery 210.

Figure 3:
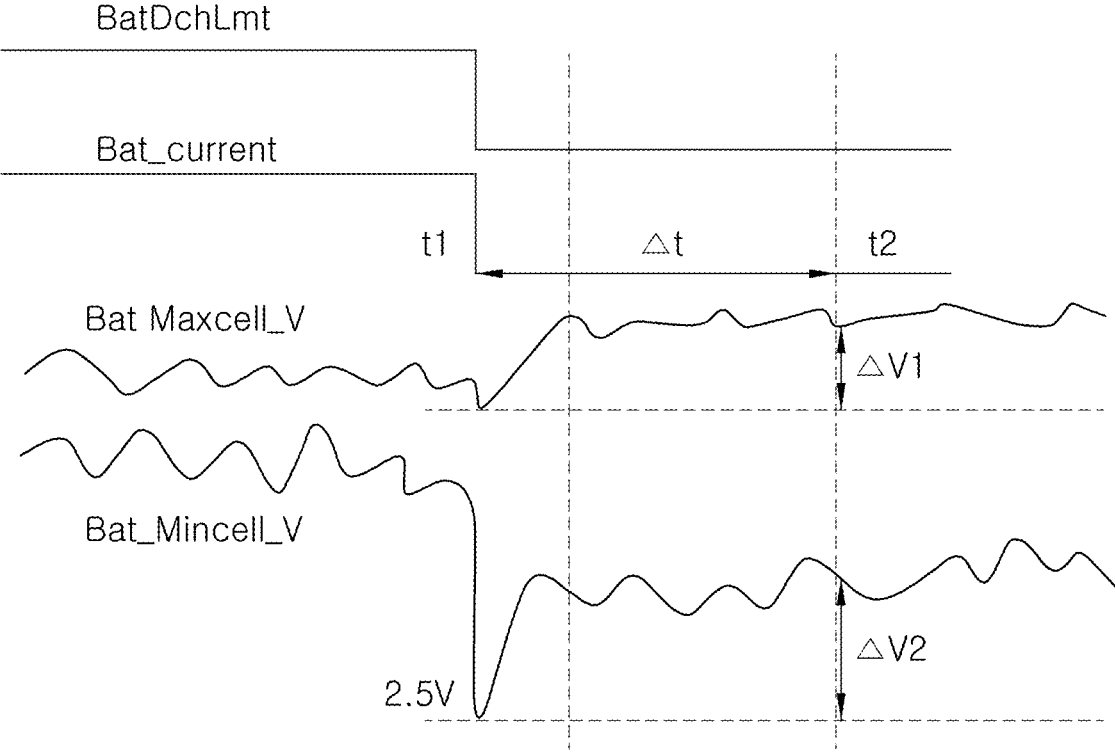
FIG. 3 illustrates an example of a method for determining whether voltage detection abnormality has occurred based on a difference in an amount of change in voltage of battery cells according to an exemplary embodiment of the present disclosure.

For example, referring to FIG. 3, a first offset ($\Delta$V1) may be defined as a difference value between the voltage of the first battery cell (Bat_Maxcell) with the highest voltage among the plurality of battery cells forming the battery 210 at the first time point (t1), and the voltage at the second time point (t2) after a preset predetermined time period ($\Delta$t) has elapsed from the first time point (t1).

Furthermore, a second offset ($\Delta$V2) may be defined as a difference value between the voltage of the second battery cell (Bat_Mincell_V) with the lowest voltage among the plurality of battery cells forming the battery 210 at the first time point (t1), and the voltage at the second time point (t2).

In the instant case, the battery management unit 230 may be configured to determine whether abnormality has occurred in the voltage detection of the battery 210 based on whether the absolute value ($|\Delta$V1$-\Delta$V2$|$) of the difference value between the first offset ($\Delta$V1) and the second offset ($\Delta$V2) is greater than a preset threshold value.

In the instant case, the preset threshold value may be set to various values depending on the system configuration, for example, may be set to 400 mV.

In the instant case, if the absolute value ($|\Delta$V1$-\Delta$V2$|$) of the difference value between the first offset ($\Delta$V1) and the second offset ($\Delta$V2) is greater than a preset threshold value, the battery management unit 230 may be configured to determine that abnormality has occurred in the voltage detection of the battery 210.

Furthermore, the battery management unit 230 may be configured to determine whether abnormality has occurred in the voltage detection of the battery 210 based on whether the signs of the first offset ($\Delta$V1) and second offset ($\Delta$V2) are the same or opposite.

In the instant case, whether the signs of the first offset ($\Delta$V1) and second offset ($\Delta$V2) are the same or opposite may be determined depending on whether the result of multiplying the first offset ($\Delta$V1) and the second offset ($\Delta$V2) is positive or negative.

In the instant case, if the result of multiplying the first offset ($\Delta$V1) and the second offset ($\Delta$V2) is a negative number, the battery management unit 230 may be configured to determine that abnormality has occurred in the voltage detection of the battery 210.

A comparison condition between the absolute value ($|\Delta$V1$-\Delta$V2$|$) of the difference value between the first offset ($\Delta$V1) and the second offset ($\Delta$V2) and a preset threshold value may be defined as Condition 1, and a condition regarding whether the signs of the first offset ($\Delta$V1) and second offset ($\Delta$V2) are the same or opposite may be defined as Condition 2.

In the instant case, the battery management unit 230 may be configured to determine that abnormality has occurred in the voltage detection of the battery 210 if one or more of Conditions 1 and 2 are satisfied.

Furthermore, the battery management unit 230 may be configured to determine that abnormality has occurred in the voltage detection of the battery 210 if both Condition 1 and Condition 2 are satisfied.

Figure 4:
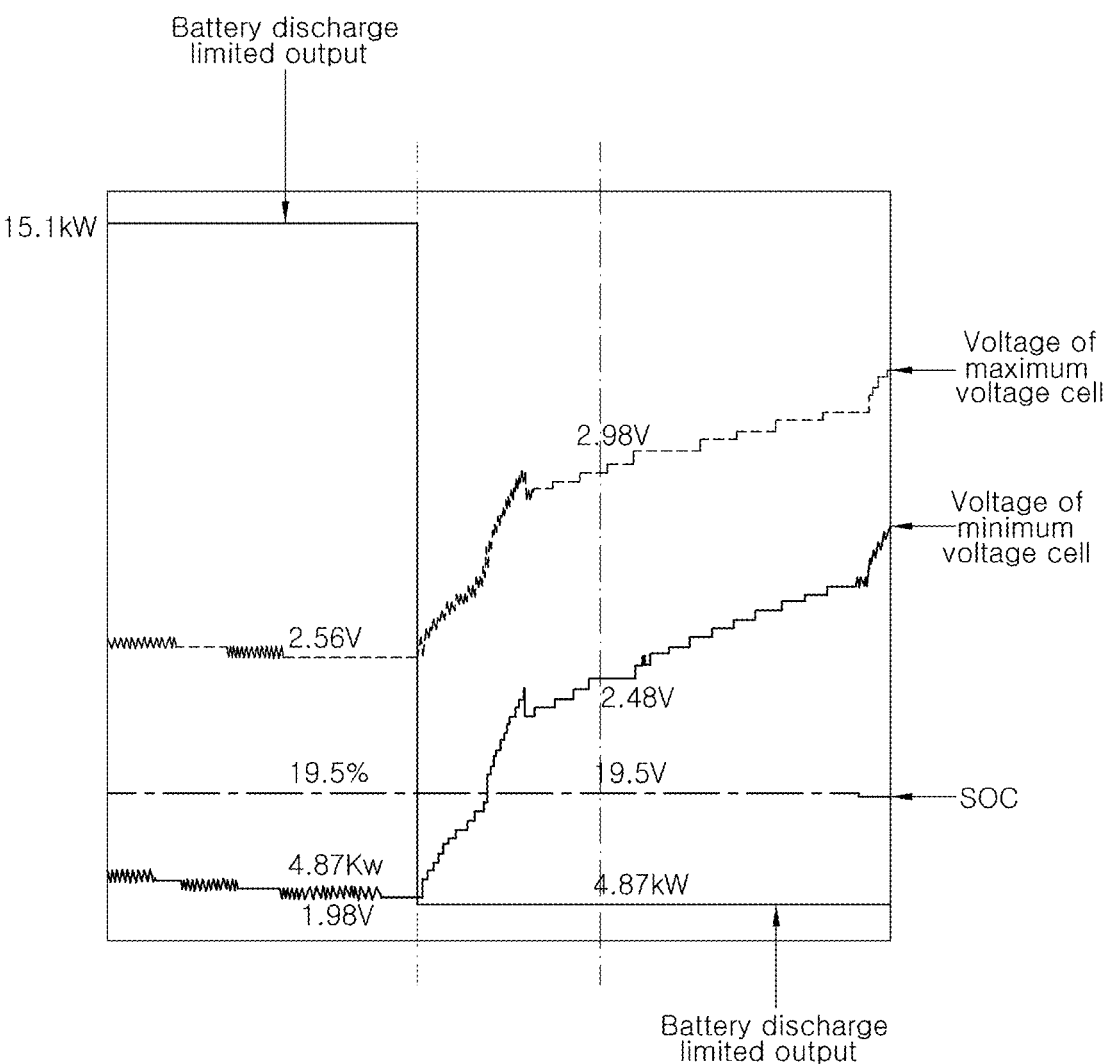
FIG. 4 illustrates another example of a situation in which a battery discharge power of an eco-friendly vehicle is limited due to voltage sensing defect.

Meanwhile, referring to FIG. 4, if the voltage of the cell with the lowest voltage among the cells forming the battery 210 drops to 1.98 V or less, the vehicle's battery discharge power may drops from 15.1 kW to 4.87 kW. In the instant case, the voltage of the cell with the lowest voltage gradually recovers from 1.98V due to battery discharge output limitation, and may recover to 2.48V after a predetermined time period. Furthermore, the voltage of the cell with the highest voltage may recover from 2.56V to 3.22V during the same time period. In the instant case, the change amount in the voltage of the cell with the lowest voltage is 0.5V, the change amount in the voltage of the cell with the highest voltage is 0.66V, and the difference between the absolute values of the first offset and the second offset is 160 mV, which is almost similar. Furthermore, because the first offset and the second offset are positive numbers, in the instant case, it may be determined that abnormality has occurred in the voltage detection of the battery 210.

Figure 5:
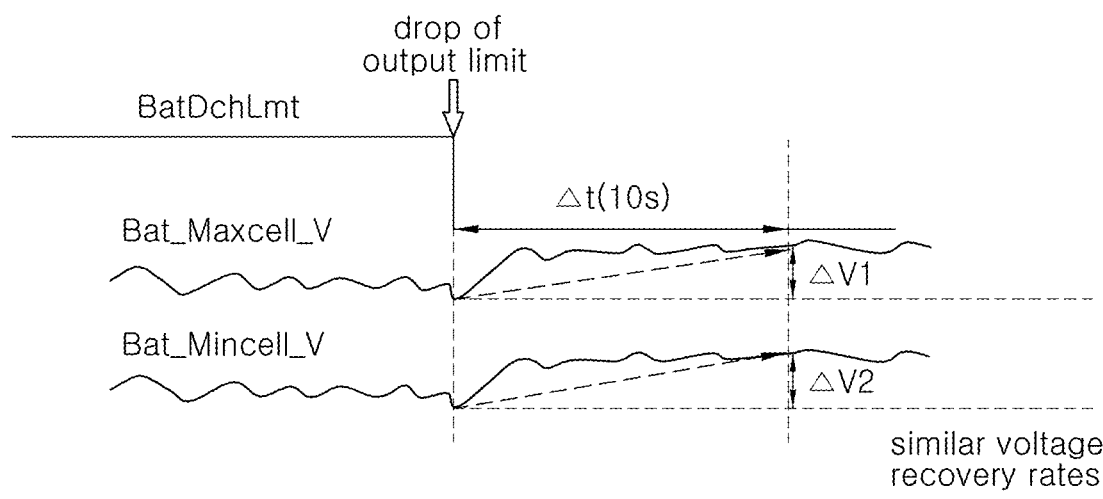
FIG. 5 illustrates an example of a voltage change of battery cells for a certain time period when battery discharge power is limited in a normal sensing situation.
Figure 6:
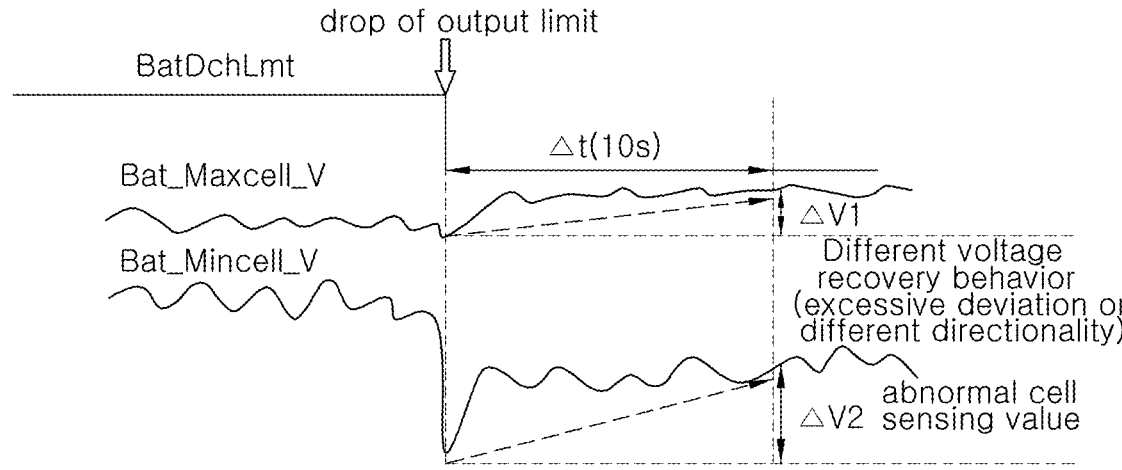
FIG. 6 illustrates an example of a voltage change of battery cells for a predetermined time period when battery discharge power is limited in an abnormal sensing situation.

Furthermore, comparing FIG. 5 and FIG. 6, the battery management unit 230 may be configured to determine a case in which the voltage change of battery cells for a certain time period, especially the voltage change of the cell with the highest voltage and the voltage change of the cell with the lowest voltage being similar in the battery discharge power limited situation, as illustrated in FIG. 5, as a normal sensing situation. The battery management unit 230 may be configured to determine a case in which the voltage changes of the battery cells are different as illustrated in FIG. 6, as an abnormal sensing situation.

Referring again to FIG. 2, the battery management unit 230 may be configured to determine that abnormality has occurred in the voltage detection of the battery 210 only if the battery 210 is in a normal condition.

In the instant case, the normal condition may be determined based on the battery's state of charge (SOC), the battery's temperature, and the battery's state of health (SOH).

For example, the battery management unit 230 may be configured to determine whether the battery 210 is in a normal condition based on whether the SOC value of the battery exceeds a threshold SOC.

In the instant case, the threshold SOC may be set to various values depending on the system configuration, for example, it may be set to 20%.

Furthermore, the battery management unit 230 may be configured to determine whether the battery 210 is in a normal condition based on whether the temperature of the battery is at or above a threshold temperature.

In the instant case, the threshold temperature may be set to various values depending on the system configuration, for example, it may be set to 0° C.

Furthermore, the battery management unit 230 may be configured to determine whether the battery 210 is in a normal condition based on whether the state of health (SOH) of the battery is at or above the threshold SOH.

In the instant case, the threshold SOH may be set to various values depending on the system configuration, for example, it may be set to 70%.

Meanwhile, the battery management unit 230 may further determine whether abnormality has occurred in the battery 210 in case where the limited discharge output of the battery 210 decreases at or below the threshold power while the vehicle is running, but no abnormality occurs in the voltage detection of the battery 210.

In the instant case, the battery management unit 230 may be configured to determine that low voltage abnormality has occurred in the battery 210 if the voltage of the second battery cell is less than the first threshold voltage.

In the instant case, the first threshold voltage may be set to various values depending on the system configuration, for example, 1.5V.

Furthermore, if the voltage difference between the first battery cell and the second battery cell exceeds a second threshold voltage, the battery management unit 230 may be configured to determine that battery cell voltage deviation abnormality has occurred in the battery 210.

In the instant case, the second threshold voltage may be set to various values depending on the system configuration, for example, 1V.

The sensor unit 250 detects the voltage or temperature of the battery 210.

In the instant case, the sensor unit 250, although not illustrated in the drawing, may include at least one voltage sensor and/or at least one temperature sensor.

In the instant case, the sensor unit 250 may measure all voltage changes of the battery cells forming the battery 210.

The vehicle control unit 270 is configured to control the vehicle based on the output of the battery 210.

In an exemplary embodiment of the present disclosure, the battery management unit 230 and the vehicle control unit 270 may be implemented as separate processor. Alternatively, the battery management unit 230 and the vehicle control unit 270 may be implemented as a single processor.

FIG. 7 is a flowchart illustrating a method for verifying battery voltage detection according to an exemplary embodiment of the present disclosure.

A method for verifying battery voltage detection according to various exemplary embodiments of the present disclosure may be performed by the system for verifying battery voltage detection 200 of the exemplary embodiment of FIG. 2.

Referring to FIG. 7, the battery management unit 230 monitors the limited discharge output of the battery 210 while the vehicle is running (S705) and is configured to determine whether the limited discharge output of the battery has decreased at or below a threshold power (S710).

As a result of the determination in step S710, if the limited discharge output of the battery decreases to or below the threshold power, it is determined whether the discharge output of the battery 210 is maintained at or below the threshold power for a threshold time (S715).

In the instant case, the threshold time may be the time from a first time point when the limited discharge output of the battery 210 decreases at or below the threshold power to a second time point when a preset predetermined time period has elapsed.

In the instant case, the threshold time may be set in various ways depending on the system configuration, for example, it may be set to 10 seconds.

In the instant case, to determine whether abnormality has occurred in the voltage detection of the battery 210, the battery management unit 230 may compare the differences in the amount of changes between the voltage of a first battery cell with the highest voltage at the first time point among the plurality of battery cells and the voltage of a second battery cell with the lowest voltage at the first time point.

Furthermore, the battery management unit 230 is configured to determine whether the absolute value ($|\Delta V1-\Delta V2|$) of the difference value between the first offset ($\Delta V1$) and the second offset ($\Delta V2$) is greater than a preset threshold value, or whether a value obtained by multiplying the first offset ($\Delta V1$) and the second offset ($\Delta V2$) is less than 0 (S720).

In the instant case, the preset threshold may be set to various values depending on the system configuration, for example, may be set to 400 mV.

In the instant case, a comparison condition between the absolute value ($|\Delta V1-\Delta V2|$) of the difference value between the first offset ($\Delta V1$) and the second offset ($\Delta V2$) and a preset threshold value may be defined as Condition 1, and a condition regarding whether the signs of the first offset ($\Delta V1$) and second offset ($\Delta V2$) are the same or opposite may be defined as Condition 2.

In the instant case, it is illustrated that it is determined in step S720 whether the determination condition for whether abnormality has occurred in voltage detection is satisfied based on whether one or more of Condition 1 and Condition 2 are satisfied, but depending on the system configuration, it may be determined whether the determination condition for whether abnormality has occurred in voltage detection is satisfied based on both Condition 1 and Condition 2 are satisfied.

Furthermore, the battery management unit 230 is configured to determine whether the SOC value of the battery exceeds a threshold SOC value, the temperature of the battery is greater than or equal to a threshold temperature, and the state of health (SOH) of the battery is greater than or equal to a threshold SOH (S725).

In the instant case, the threshold SOC may be set to various values depending on the system configuration, for example, may be set to 20%.

Furthermore, the threshold temperature may be set to various values depending on the system configuration, for example, may be set to 0° C.

Furthermore, the threshold SOH may be set to various values depending on the system configuration, for example, may be set to 70%.

As a result of the determination in step S725, if the SOC value of the battery exceeds the threshold SOC value, the temperature of the battery is greater than or equal to the threshold temperature, and the state of health (SOH) of the battery is greater than or equal to the threshold SOH, the battery management unit 230 is configured to determine that voltage misdetection has occurred (S730), recovers the output of the battery 210 to a normal output, and drives the vehicle using the vehicle control unit 270 (S735).

In the instant case, it is illustrated in FIG. 7 that it is determined that misdetection has occurred in the voltage of the battery 210 when the following conditions are satisfied: the SOC value of the battery exceeds the threshold SOC value, the temperature of the battery is greater than or equal to the threshold temperature, and the state of health (SOH) of the battery is greater than or equal to the threshold SOH, but it may be determined that misdetection has occurred in the voltage of the battery 210 when at least one or two of the conditions for SOC value, temperature, and SOH are satisfied.

Furthermore, the battery management unit 230 is configured to determine whether the voltage of the second battery cell is less than the first threshold voltage (S740), and if the voltage of the second battery cell is less than the first threshold voltage, the battery management unit 230 is configured to determine that low voltage abnormality has occurred in the battery 210 (S745).

In the instant case, the first threshold voltage may be set to various values depending on the system configuration, for example, 1.5V.

Furthermore, the battery management unit 230 is configured to determine whether the voltage difference between the first battery cell and the second battery cell exceeds the second threshold voltage (S750), and is configured to determine that voltage deviation abnormality has occurred if the voltage difference between the first battery cell and the second battery cell exceeds the second threshold voltage (S755).

In the instant case, the second threshold voltage may be set to various values depending on the system configuration, for example, 1V.

According to the exemplary embodiments of the present disclosure described so far, the reliability of voltage sensing may be verified when the battery of an eco-friendly vehicle is low voltage.

Furthermore, it is possible to prevent unnecessary battery power limitations from occurring due to voltage sensing problems in eco-friendly vehicles or defects in predetermined battery cells.

Furthermore, driver safety may be ensured by preventing the vehicle from suddenly stopping due to unnecessary limiting of the vehicle's battery discharge power.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for verifying battery voltage detection in a vehicle, the method comprising the steps of:

determining, by a processor, whether abnormality has occurred in voltage detection based on a voltage of a first battery cell with a highest voltage among a plurality of battery cells forming a battery at a first time point in response that a limited discharge output of the battery decreases at or below a threshold power while the vehicle is running and a voltage of a second battery cell with a lowest voltage at the first time point; and recovering, by the processor, an output of the battery to a normal output that allows the vehicle to drive normally and driving the vehicle based on the output of the battery in response that the processor concludes that the abnormality has occurred in the voltage detection.

2. The method of claim 1, further including the step of determining, by the processor, whether the limited discharge output of the battery is maintained at or below the threshold power to a second time point in response that a preset predetermined time period has elapsed from the first time point in response that the limited discharge output of the battery decreases to or below the threshold power while the vehicle is running, wherein the step of determining whether the abnormality has occurred in the voltage detection is performed in response that the limited discharge output of the battery is maintained at or below the threshold power from the first time point to the second time point.

3. The method of claim 1, further including the step of maintaining, by the processor, a discharge output of the battery at a target minimum output value in response that the limited discharge output of the battery is maintained at or below the threshold power from the first time point to the second time point.

4. The method of claim 1, wherein the step of determining whether the abnormality has occurred in the voltage detection further includes the steps of:

determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, or determining whether signs of the first offset and second offset are opposite to each other.

5. The method of claim 1, wherein the step of determining whether the abnormality has occurred in the voltage detection further includes the steps of:

determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value; and determining whether signs of the first offset and second offset are opposite to each other.

6. The method of claim 4, wherein the step of determining whether the abnormality has occurred in the voltage detection further includes the step of determining whether a state of charge (SOC) value of the battery exceeds a threshold SOC.

7. The method of claim 6, wherein the step of determining whether the abnormality has occurred in the voltage detection further includes the step of determining whether a temperature of the battery is greater than or equal to a threshold temperature.

8. The method of claim 7, wherein the step of determining whether the temperature of the battery is greater than or equal to the threshold temperature further includes the step of determining whether the temperature of the battery cell with a lowest temperature among the plurality of battery cells forming the battery is greater than or equal to the threshold temperature.

9. The method of claim 7, wherein the step of determining whether the abnormality has occurred in the voltage detection further includes the step of determining whether a state of health (SOH) of the battery is greater than or equal to a threshold SOH.

10. The method of claim 1, further including the step of determining, by the processor, whether the abnormality has occurred in the battery.

11. The method of claim 10, wherein the step of determining whether the abnormality has occurred in the battery further includes the steps of:

determining whether the voltage of the second battery cell is less than a first threshold voltage; and determining whether a voltage difference between the first battery cell and the second battery cell exceeds a second threshold voltage.

12. A system for verifying battery voltage detection in a vehicle, the system comprising:

a battery that stores power energy for driving the vehicle and includes a plurality of cells;

a sensor unit including a voltage sensor that detects voltage of the plurality of battery cells forming the battery;

a battery management unit that is configured to determine whether abnormality has occurred in voltage detection based on a voltage of a first battery cell with a highest voltage among the plurality of battery cells forming the battery at a first time point in response that a limited discharge output of the battery decreases at or below a threshold power while the vehicle is running and a voltage of a second battery cell with a lowest voltage at the first time point, and to recover an output of the battery to a normal output that allows the vehicle to drive normally in response that the battery management unit concludes that the abnormality has occurred in the voltage detection; and a vehicle control unit which is configured to control the vehicle based on the output of the battery.

13. The system of claim 12, wherein the battery management unit is further configured to determine whether the limited discharge output of the battery is maintained at or below the threshold power to a second time point in response that a preset predetermined time period has elapsed from the first time point in response that the limited discharge output of the battery decreases to or below the threshold power while the vehicle is running, wherein the battery management unit is further configured to determine whether the abnormality has occurred in the voltage detection is performed in response that the limited discharge output of the battery is maintained at or below the threshold power from the first time point to the second time point.

14. The system of claim 12, wherein the battery management unit is further configured to maintain a discharge output of the battery at a target minimum output value in response that the limited discharge output of the battery is maintained at or below the threshold power from the first time point to the second time point.

15. The system of claim 12, wherein the battery management unit is further configured to determine whether the abnormality has occurred in the voltage detection by determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, or determining whether signs of the first offset and second offset are opposite to each other.

16. The system of claim 12, wherein the battery management unit is further configured to determine whether the abnormality has occurred in the voltage detection by determining whether an absolute value of a difference between a first offset corresponding to a difference between the voltage of the first battery cell at the first time point and the voltage of the first battery cell at the second time point, and a second offset corresponding to a difference between the voltage of the second battery cell at the first time point and the voltage of the second battery cell at the second time point is greater than a preset threshold value, and determining whether signs of the first offset and second offset are opposite to each other.

17. The system of claim 15, wherein the battery management unit is further configured to determine whether the abnormality has occurred in the voltage detection by determining whether a state of charge (SOC) value of the battery exceeds a threshold SOC.

18. The system of claim 17, wherein the battery management unit is further configured to determine whether the abnormality has occurred in the voltage detection by determining whether a temperature of the battery is greater than or equal to a threshold temperature.

19. The method of claim 18, wherein the battery management unit is further configured to determine whether the temperature of the battery is greater than or equal to the threshold temperature by determining whether the temperature of the battery cell with a lowest temperature among the plurality of battery cells forming the battery is greater than or equal to the threshold temperature.

20. The system of claim 18, wherein the battery management unit is further configured to determine whether the abnormality has occurred in the voltage detection by determining whether a state of health (SOH) of the battery is greater than or equal to a threshold SOH.

21. The system of claim 12, wherein the battery management unit is further configured to determine whether the abnormality has occurred in the battery.

22. The system of claim 12, wherein the battery management unit is further configured to determine whether the abnormality has occurred in the battery by determining whether the voltage of the second battery cell is less than a first threshold voltage, and determining whether a voltage difference between the first battery cell and the second battery cell exceeds a second threshold voltage.

* * * * *